United States Patent
Nishioka

(10) Patent No.: US 8,460,556 B2
(45) Date of Patent: Jun. 11, 2013

(54) BACTERIAL ELIMINATOR

(76) Inventor: Youichi Nishioka, Shinagawa-ku (JP)

( * ) Notice: Subject to any disclaimer, the term of this patent is extended or adjusted under 35 U.S.C. 154(b) by 967 days.

(21) Appl. No.: 11/572,788

(22) PCT Filed: Sep. 9, 2004

(86) PCT No.: PCT/JP2004/013160
§ 371 (c)(1),
(2), (4) Date: Oct. 8, 2008

(87) PCT Pub. No.: WO2006/011243
PCT Pub. Date: Feb. 2, 2006

(65) Prior Publication Data
US 2009/0050543 A1 Feb. 26, 2009

(30) Foreign Application Priority Data

Jul. 27, 2004 (JP) .................. 2004-219004

(51) Int. Cl.
*C02F 1/32* (2006.01)
(52) U.S. Cl.
USPC ............ 210/748.11; 210/87; 210/748.01; 210/748.1; 250/432 R
(58) Field of Classification Search
USPC ............ 210/85–95, 748.1, 138–140, 748.01, 210/748.11, 748.14, 764; 250/431, 432 R–438; 422/22, 24; 315/360, DIG. 5
See application file for complete search history.

(56) References Cited

U.S. PATENT DOCUMENTS

| | | | |
|---|---|---|---|
| 4,755,292 A | * | 7/1988 | Merriam .................. 210/192 |
| 5,230,792 A | | 7/1993 | Sauska |
| 5,324,423 A | * | 6/1994 | Markham .................. 210/87 |
| 5,547,590 A | * | 8/1996 | Szabo .................. 210/748.11 |
| 5,935,431 A | * | 8/1999 | Korin .................. 210/205 |

(Continued)

FOREIGN PATENT DOCUMENTS

| | | |
|---|---|---|
| JP | 62-221485 A | 9/1987 |
| JP | 6-111762 A | 4/1994 |

(Continued)

OTHER PUBLICATIONS

Examination Report Under Section 18(3) mailed Nov. 3, 2008, issued in corresponding United Kingdom Application No. GB0701803.9, filed Jan. 31, 2007 (now U.K. Patent No. GB2430431), 2 pages.

*Primary Examiner* — Duane Smith
*Assistant Examiner* — Thomas McKenzie
(74) *Attorney, Agent, or Firm* — Christensen O'Connor Johnson Kindness PLLC

(57) ABSTRACT

The object of the present invention is to provide a bacterial eliminator suitable for reduction in size or lowering of cost.

A UV filament lamp is preheated by a control section even when water is not flowing. Consequently, the UV filament lamp can be lit immediately upon flow of water. The lamp can thereby be kept unlit when water is not flowing. Consequently, the lamp is unlikely to overheat easily when water is not flowing. Also, power consumption is reduced and lifespan of the lamp can be prolonged. If the lamp overheats and unheated water flows in, there is a possibility of the lamp being damaged. In order to avoid such damage, a special structure or material is normally required. Since overheating of the lamp can be avoided with the invention, a special structure or material for avoiding damage to the lamp due to unheated water are not necessary, or the structure can be simplified.

11 Claims, 5 Drawing Sheets

U.S. PATENT DOCUMENTS

| | | | |
|---|---|---|---|
| 6,461,520 B1 * | 10/2002 | Engelhard et al. | 210/748.12 |
| 6,538,378 B1 * | 3/2003 | Nakano | 313/571 |
| 7,279,092 B2 * | 10/2007 | Moody et al. | 210/170.08 |
| 7,396,456 B2 * | 7/2008 | Tsai | 210/167.1 |
| 7,564,201 B2 * | 7/2009 | Steckling | 315/312 |
| 7,641,790 B2 * | 1/2010 | Maiden | 210/91 |
| 7,862,728 B2 * | 1/2011 | Yencho | 210/748.01 |
| 2003/0209502 A1 * | 11/2003 | Lacasse et al. | 210/760 |
| 2004/0061069 A1 | 4/2004 | Schalble | |
| 2004/0140435 A1 | 7/2004 | Nishioka | |

FOREIGN PATENT DOCUMENTS

| | | |
|---|---|---|
| JP | 8-132032 A | 5/1996 |
| JP | 9-306424 A | 11/1997 |
| JP | 11-128913 A | 5/1999 |
| JP | 11-273881 A | 10/1999 |
| JP | 2001-00963 A | 1/2001 |
| JP | 2001-29943 A | 2/2001 |
| JP | 2003-144912 A | 5/2003 |

* cited by examiner

FIG.8

| lamp No. | usage time (minutes) | next use order |
|---|---|---|
| 1 | 50 | 3 |
| 2 | 20 | 2 |
| 3 | 10 | 1 |
| ⋮ | ⋮ | ⋮ |

BACTERIAL ELIMINATOR

BACKGROUND

1. Field of the Invention

The present invention relates to a bacterial eliminator for killing bacteria (including viruses) contained in water delivered from water supply means such as a water main.

2. Description of the Related Art

The fact that ultra-violet light has a bacteria eliminating effect is well known. It is therefore possible to propose a water purifier having sterilizing effect by incorporating an ultraviolet lamp into a mains water supply apparatus.

However, an ultraviolet lamp generates ultraviolet light using electrons in mercury gas due to thermoelectron discharge from a filament.

Accordingly, a conventional ultraviolet lamp requires time until temperature is raised to cause thermoelectron discharge. In ultraviolet lamps of the type using electric discharge also, a certain amount of time is required until discharge occurs and ultraviolet light is generated.

In a bacterial eliminator using an ultraviolet lamp, if water flows before lighting the ultraviolet lamp (namely before sufficiently generating ultraviolet light), water that has not been subjected to bacteria removal will be supplied. For this reason, in order to use an ultraviolet lamp in a bacteria eliminator, it is necessary have the lamp normally lit, regardless of whether water is flowing or not.

However, if the lamp is kept lit, when there is no water flow, water around the lamp is heated by the lamp. Therefore the cooling effect of the water is reduced and the temperature of the lamp itself rises.

After that, if a tap is opened and water flows, the lower temperature water comes into contact with the lamp. If that happens, there is a potential problem of the lamp being damaged. Therefore, if an ultraviolet lamp is to be used in a bacteria eliminator, it is necessary to have a separate structure and material for avoiding damage to the lamp and there is a problem that the device will become large in size and expensive.

The present invention has been conceived in view of the above described situation and an object of the invention is to provide a bacteria eliminator suitable for size reduction and cost reduction.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The bacteria eliminator disclosed herein is a bacteria eliminator for removing bacteria from water supplied from a water main or other water supply means, and comprises a flow passage, a detection section, a UV filament lamp and a control section, the flow passage allowing the passage of water sent from the water supply means, the detection section sending detection signals corresponding to flow amount of the water to the control section, and the UV filament lamp generating ultra violet light, with the control section having:

(1) a function of causing electrical current for pre-heating to flow in the UV filament lamp when the UV filament lamp is not lit, and (2) a function of lighting the UV filament lamp according to detection signals from the detection section.

With the bacteria eliminator, there may be a plurality of UV filament lamps, and the control section may control a number of UV filament lamps to be lit according to detection signals from the detection section.

In the above-described bacteria eliminator, the control section may store lighting times for the plurality of UV filament lamps and when a UV filament lamp that is not lit is to be lit again the control section may give priority to lighting of a lamp that has the shortest lighting time.

The bacteria eliminator may be further provided with a body, wherein the flow passage is formed passing through the body, the UV filament lamp(s) is arranged facing the flow passage inside the body, the body is provided with an obstructing section, and the obstructing section is arranged at an inner part of the plow passage inside the body and obstructs and agitates the flow of water.

The inner surface of the flow passage around the UV filament lamp may be made a reflecting surface for reflecting ultraviolet light.

The control section may store accumulated lighting time for the plurality of UV filament lamps and, further, the control section may generate a warning signal when the accumulated lighting time has reached or exceeded a threshold value.

According to the bacteria eliminator of the present invention, since a UV filament lamp is preheated, it is possible to keep mercury in a vapor state and it is possible to immediately obtain a sufficient amount of ultraviolet light from the UV filament lamp in response to water flow. Accordingly, when there is no flow of water it is possible to keep the lamp unlit (that is, reduce the amount of supplied current). If this is done, it becomes less likely for the lamp to overheat when there is no water flow and it becomes possible to do away with the need for a separate structure and material in order to avoid damage to the lamp, and thus simplify the structure. Therefore, according to the present invention, it becomes possible to provide a bacterial eliminator suitable for reduction in size or lowering of cost. Further, with the bacterial eliminator of the present invention the UV filament lamp is preheated, which means that it is also possible to shorten the time until thermoelectron discharge occurs and, from that point, it is also possible to immediately light a lamp in response to flow of water. Further, with the device of the present invention, since the UV filament lamp is only lit when water is flowing, the UV filament lamp lighting time is shortened and the time the lamp is off is prolonged, which means that it is possible to prolong the lifetime of the UV filament lamp.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a table for describing an example of data stored by the control section.

DETAILED DESCRIPTION

In the following, a bacteria eliminator of one embodiment of the present invention will be described with reference to the attached drawings.

Structure of the Embodiment

Figure 1:
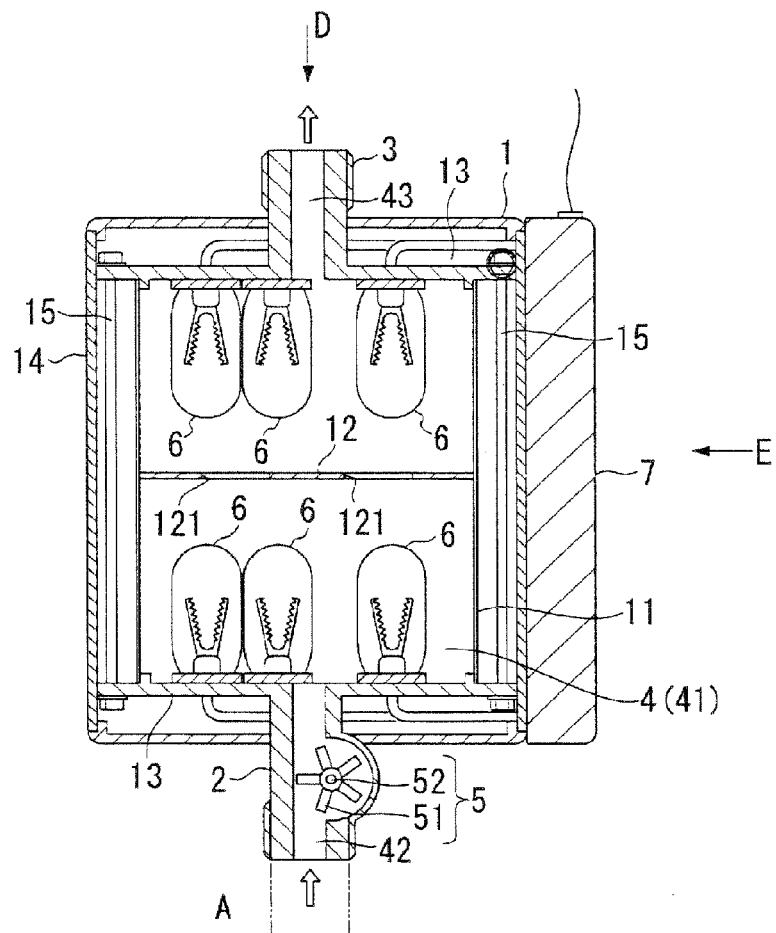
FIG. 1 is a schematic cross section along line C-C in FIG. 2.
Figure 2:
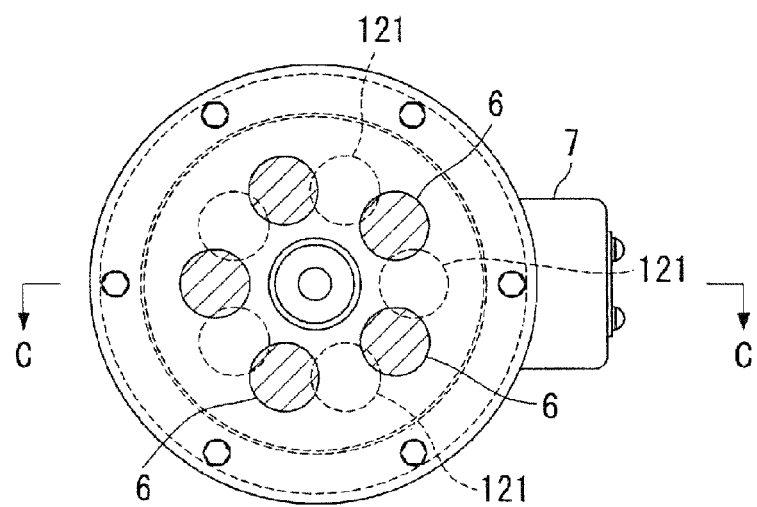
FIG. 2 is a perspective view in the direction of arrow D in FIG. 1.
Figure 3:
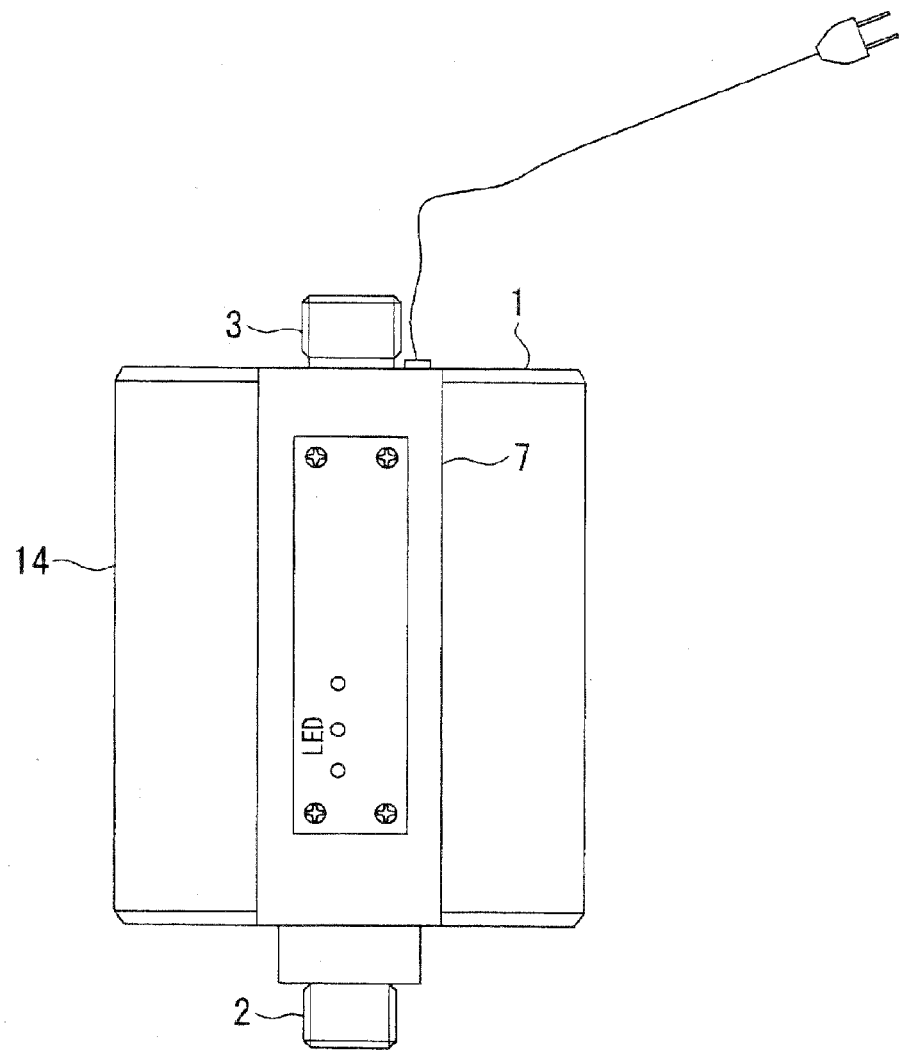
FIG. 3 is a perspective view in the direction of arrow E in FIG. 1.
Figure 4:
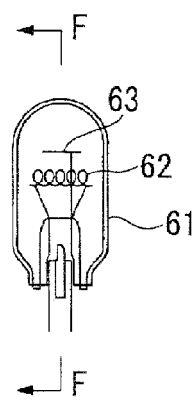
FIG. 4 is a cross sectional view of a UV filament lamp.

This bacteria eliminator comprises a body 1, induction section 2, discharge section 3, flow path 4, detection section 5, a plurality of UV filament lamps 6, and a control section 7 (refer to FIGS. 1-3).

The body 1 mainly comprises an inner tube 11, an obstruction section 12, two support bodies 13, and an outer tube 14 (refer to FIG. 2). The inner tube 11 is formed in a cylindrical shape in this embodiment. The shape of the inner tube 11 is not particularly limited. An inner surface of the inner tube 11 is made a reflecting surface for reflecting ultraviolet light. Such a reflecting surface can be easily formed by, for example, by making the inner tube 11 of metal (for example, stainless steel). As a method of forming the reflecting surface, for example, it is possible to deposit a metal layer on a glass surface using vapor deposition means or the like; but this is not particularly limiting. An inner part of the inner tube 11 constitutes a flow path section 41 forming part of the flow path 4.

The obstruction section 12 is made disk-shaped in this embodiment. The obstruction section 12 is attached to the inner surface of the inner tube 11. The extending direction of the obstruction section 12 is a direction that intersects the direction of water flow (the upward direction in FIG. 2). Specifically, the angle at which the extending direction and the water flow direction intersect is almost a right angle.

A plurality of through holes 121 is formed in the obstruction section 12, passing through in the thickness direction. It is also possible for the through holes 121 to be notches in this embodiment. That is, in this specification the expression through holes is used to include the general idea of notches.

Both of the support bodies 13 are made disk-shaped in this embodiment. Each support body 13 is attached to an end section of the inner tube 11 so as to close off the end section. The two support bodies 13 are joined by bolts 15.

The outer tube 14 is arranged at an outer side of the inner tube 11 and the support bodies 13, so as to cover the inner tube 11 and the support bodies 13.

The induction section 2 is attached to the support body 13 at an input side (lower side in FIG. 2) of the body 1. A flow path section 42 constituting part of the flow path 4 is formed at an inner part of the induction section 2. The flow path section 42 is connected to the flow path section 41 inside the body 1.

The discharge section 3 is attached to the support body 13 at an output side (upper side in FIG. 2) of the body 1. A flow path section 43 constituting part of the flow path 4 is formed at an inner part of the discharge section 3. The flow path section 43 is connected to the flow path section 41 inside the body 1.

As described above, the flow path 4 of this embodiment is comprised of the flow path section 41 inside the body 1, the flow path section 42 inside the induction section 2, and the flow path section 43 inside the discharge section 3. The output side of the flow path 4 is connected to user side piping (for example, domestic piping) by means of appropriate connecting members. The input side of the flow path 4 is connected to a water pipe (refer to FIG. 1) as water supply means. In this way, the flow path 4 passes delivered water to the user side.

The detection section 5 is arranged inside the induction section 2 in this embodiment. The detection section 5 is for detecting flow amount and is provided with a plurality of blades 51 and a shaft 52. The blades 51 are capable of rotating about the shaft 52 when water passes through the inside of the induction section 2. The rotation speed of the blades 51 varies, depending on the rate at which water flows through. Further, the detection section 5 is constructed so as to send detection signals according to the rotation speed of the blades 51 to the control section 7. The detection signals can be discrete signals such as pulse signals from an encoder or analog signals, such as voltage values from a tachogenerator. In this manner, the detection section 5 is made capable of sending detection signals corresponding to the flow amount of water to the control section 7. Incidentally, various other configurations can be used for the detection section 5 besides that described above.

The plurality of UV filament lamps 6 of this embodiment are generators of ultraviolet light. In this embodiment, five UV filament lamps 6 are fitted to an inner surface side of one support body 13, while another five UV filament lamps 6 are fitted to an inner surface side of the other support body 13 (refer to FIGS. 2-3). The UV filament lamps 6 are electrically connected to the control section 7 and electrified states are controlled by the control section 7.

Figure 5:
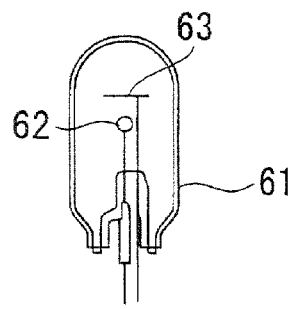
FIG. 5 is a cross section along line F-F in FIG. 4.
Figure 6:
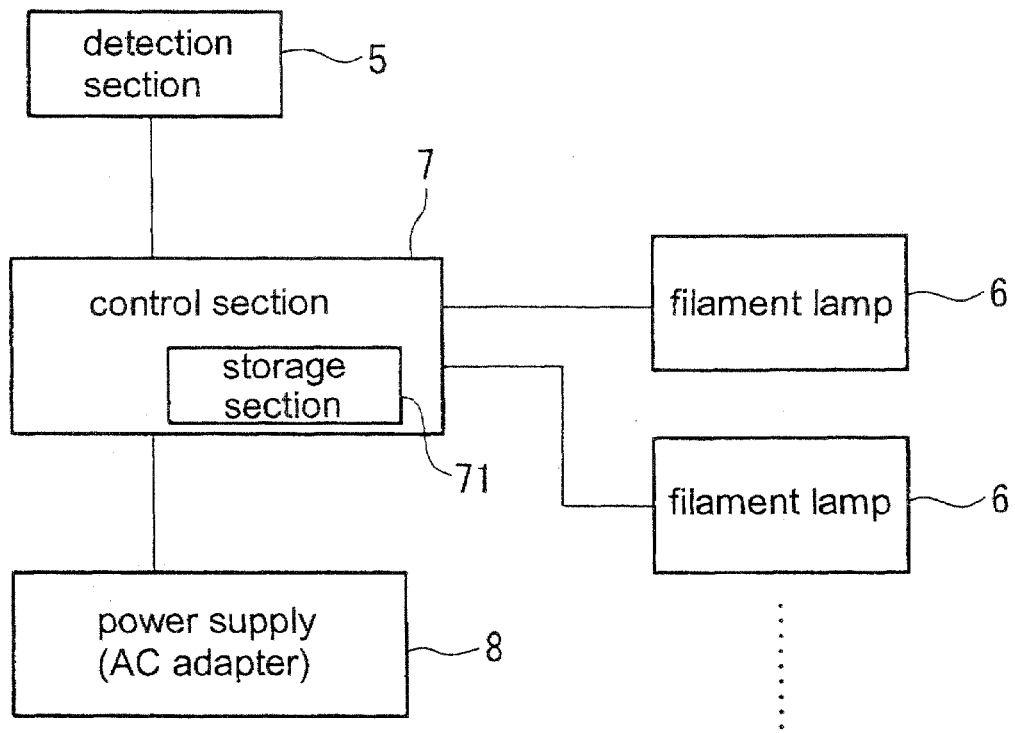
FIG. 6 is a block diagram for describing the structure of a control section.

The UV filament lamps 6 are provided with a cover 61, a filament 62 and a plate 63, as shown in FIGS. 5-6. The cover 61 is constructed from ultraviolet-ray transmitting glass. As ultraviolet-ray passing glass, there is, for example, borosilicate glass. The filament 62 and the plate 63 are electrically connected to the control section 7. The filament 62 is electrified from a power source. The plate 63 is connected to a ground side. Also, the surface of the plate 63 is coated with mercury amalgam. The filament 62 and the plate 63 are insulated.

The control section 7 is mainly constructed as a so-called microcomputer in this embodiment. Accordingly, with this embodiment it is possible to realize various functions using a computer program stored in the microcomputer. Naturally, it is also possible to configure the control section 7 using appropriate elements or circuits such as logic ICs, sequential circuits, and FPGAs, etc. It is also possible to configure the control section 7 from a plurality of elements that are physically separated, for example, but exist as functional elements. It is further possible to configure the control section 7 from a combination of a plurality of hardware items connected via a network.

In this embodiment, the control section 7 is configured exhibiting the following functions.

(1) a function of causing electrical current for pre-heating to flow in the UV filament lamps 6 when the UV filament lamps 6 are unlit, (2) a function of lighting the UV filament lamps 6 (namely generating sufficient ultraviolet light), using the control section 7, in response to a detection signal from the detection section 5, (3) a function of controlling a number of the UV filament lamps 6 that are lit according to a detection signal from the detection section 5, (4) a function of storing a lighting time for the plurality of UV filament lamps 6, and (5) a function of, when re-lighting UV filament lamps 6 that have been turned off, lighting the UV filament lamps 6 giving priority to those with the shortest lighting time.

A block diagram for describing the structure of the control section 7 is shown in FIG. 6. As shown in FIG. 6, the control section 7 is provided with a storage section 71 for storing the lighting time of the UV filament lamps 6, and other information besides. The storage section 71 is a memory provided inside the microcomputer, for example, but this is not limiting, and it can also be a medium capable of storing information used in the control section 7.

The functions of the control section 7 will be described in detail later when the operation is described.

An AC adapter 8 rectifies an AC voltage supplied from an AC power source and supplied the rectified voltage to the control section 7. In short, the AC adapter 8 of this embodiment is used as power supply means to the control section 7.

Operation of the Embodiment

Next, operation of the bacteria eliminator of the above-described embodiment will be described.

First of all, a user side tap is actuated to make water supply possible. If this is done, water flows inside the flow path 4 due to water supply pressure from the water supply source.

If this is done, the blades 51 of the detection section 5 rotate due to this water flow and a detection signal for the flow amount is sent to the control section 7. The control section 7 carries out the following operations depending on the flow amount obtained based on this detection signal.

Lamp Preheating Operation Using Control Section

In an initial state (no water flowing state), all of the UV filament lamps 6 are unlit. At this time, the control section 7 causes electrical current for preheating to flow in the UV filament lamps 6. As a current value for preheating, it is preferable to have a value such that sufficient ultraviolet light is not generated from the lamps, but it will be possible to achieve ultraviolet light generation for service sufficiently quickly. If the current is in this range, the lamps 6 are not superheated and there is, therefore, the advantage that even if low temperature water flows, the lamps 6 will not be damaged. Specifically, a lower limit for the current value is preferably considered to be such that it is possible to maintain the vaporized state for the mercury coated on the plate 63. Also, an upper limit of the current value is preferably considered to be such that a thermoelectron discharge amount from the filament 62 to the plate 63 is sufficiently low (for example, half or less than at the time of normal lighting, and more preferably, 1/10th or less).

According to the bacteria eliminator of this embodiment, by causing current for preheating to flow in the lamps 6, it is possible to rapidly relight the lamps (reinitiate irradiation of ultraviolet light). If this is done, then even if the lamps 6 are left unlit when water is not flowing, it is possible to relight the lamps immediately when water flows and perform bacteria elimination, and it is possible to lower the possibility of water flowing that has not been subjected to bacteria elimination. Therefore, compared to the case where the lamps 6 were left on, it is possible to improve the usage efficiency of consumed electrical power.

Lamp Lighting Operation Using Control Section

The control section 7 lights the UV filament lamps 6 in response to detection signals from the detection section 5. For example, the control section 7 holds a threshold value for flow amount in the storage section 71. If the flow amount obtained by the detection signals exceeds the threshold value, it is possible to cause current to flow in the UV filament lamps 6 and light them.

With this embodiment, as described above, since the lamps 6 are preheated, it is possible to immediately light the lamps 6 in response to the detection signal. It is therefore possible to lower the danger of water passing that has not been subjected to bacteria elimination. If the flow amount drops below the threshold value, the control section 7 will turn the lamps 6 off. Preheating is still maintained, however. It is possible to make the threshold for turning lamps off different to the threshold for turning them on.

In more detail, it is preferable to perform the following control. As a prerequisite, there is also a circuit structure enabling electrification in the plate 63. In this case, at the time of lighting the lamps, the current flowing to the filament 62 flows for about one second and then the inside of the UV filament lamp 6 heats up. Next, together with supply of current to the plate 63, current flowing to the filament 62 drops to the preheating current value, or to zero. In this case, radiation of ultraviolet light is carried out utilizing thermoelectron discharge from the plate 63. If this is done, the usage efficiency of electrical current is significantly improved.

Control Operation for Lighting a Number of Lamps by Control Section

Figure 7:
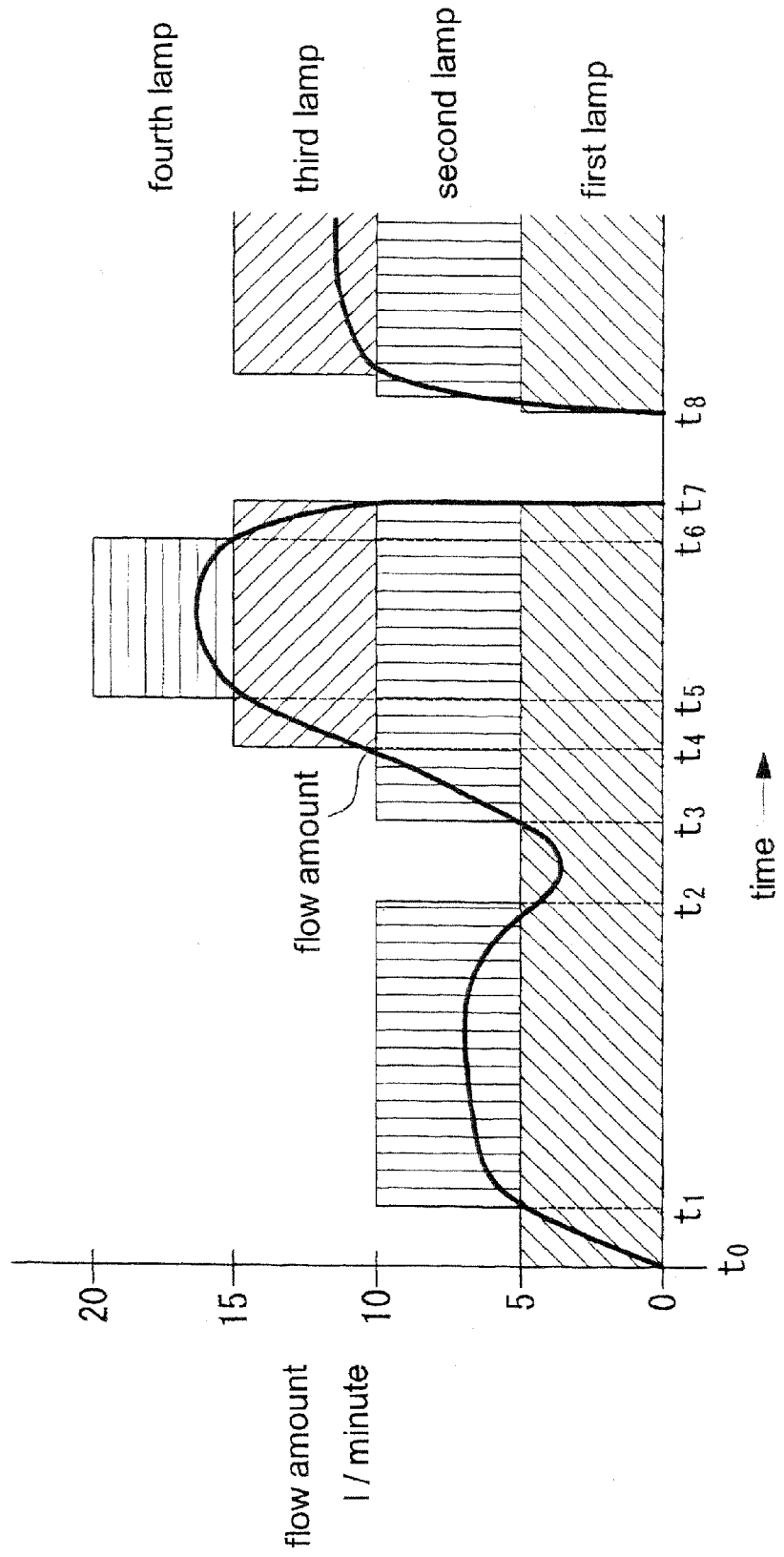
FIG. 7 is a graph for describing the operation of the control section.

The control section 7 controls a number of the UV filament lamps 6 that will be lit in response to detection signals from the detection section 5. This function can be implemented as follows, for example. First of all, the control section 7 stores threshold values according to a number of lamps. In FIG. 7, an example where difference for threshold values for flow amount is made, 5 liters/minute is mentioned. Of course, various methods can be adopted for setting the threshold values. With this drawing, only threshold values corresponding to four lamps are mentioned. Operation will be described in the following while referring to FIG. 7.

Time $T_0$

When flow rate is 0 liters/minute, no lamps are lit. If flow amount exceeds 0 liters/minute, that is, if even slight flow amount is detected, the control section 7 lights the first lamp 6. In an initial state, it is possible to arbitrarily make any lamp the first lamp. This is also true for the second and subsequent lamps.

Time $T_1$

If flow amount exceeds 5 liters/minute, the control section 7 also lights the second lamp 6.

Time $T_2$

If the flow amount drops below the threshold value, the control section 7 will turn the second lamp 6 off.

Time $T_3$ to $T_6$

Each time the flow amount exceeds a threshold value, the control section 7 sequentially turns on the second to fourth lamps 6.

Time $T_7$

If the flow rate returns to 0 liters/minute, all of the lamps are turned off.

Time $T_8$ and After

If flow rate again increases, lamps are lit according to the flow amount. In this case, the order of lighting the lamps is changed (this will be described later).

Function for Storing for Lighting Times by Control Section

The control section 7 respectively stores the lighting time for each UV filament lamp 6. This can be easily implemented by adding the times at which current flowed in order to light the lamps 6. The control section 7 issues an alarm signal if the lighting time for any lamp 6 exceeds a reference value. The warning signal is transmitted, for example, using radio. By transmitting the warning signal, it is possible to replace the lamp 6 before the expiration date of the lamp 6 expires and it is possible to guarantee the bacteria eliminating capability of the bacteria eliminator.

Function for Changing Order for Lighting by Control Section

When re-lighting UV filament lamps 6 that have been turned off, the control section 7 lights the UV filament lamps 6, giving priority to those with the shortest lighting time. This function can be implemented as follows, for example. First, the control section 7 stores respective lamps and usage times in correspondence with each other, as shown in FIG. 8. In the example of FIG. 7, this operation is carried out from time $t_o$ to time $t_7$, for example. After time $t_7$ has been reached, the control section 7 next determines the lighting order of lamps used. The order gives priority to lamps with a short lighting time (accumulated value). In FIG. 8, only three lamps are shown. With this example, the usage order is with the third lamp first, and the first lamp third.

After the usage order has been rearranged, the usage times of the lamps from the initial state are added up and stored. Then, when all the lamps have been turned off, the usage order is again rearranged based on the accumulated amounts for usage time.

With this embodiment, the lamp usage order is changed according to usage times, which means that it is possible to average the usage times for the lamps. Accordingly, it is possible to extend the lifespan of the lamps 6 overall and to simplify the replacement operation for the lamps.

Bacteria Elimination Operation by Filament Lamps

Water entering into the body 1 through the induction section 2 is subjected to bacteria elimination using ultraviolet light irradiated from the UV filament lamps 6. With this embodiment, since the flow path section 41 inside the body 1 has an expanded diameter compared to the flow path section 42 inside the induction section 2, it is possible to slow the flow rate of water inside the body 1 and it is possible to improve the certainty of bacteria elimination.

Further, with this embodiment, the obstruction section 12 is provided inside the body 1 and flow of water is slowed and disturbed by through holes 121. In this way, it is possible to prolong the time that water is retained in the body 1 and it is possible to further improve the certainty of bacteria elimination.

Also, by disturbing the flow of water, it becomes easier to vary the relative position of bacteria with respect to each other. If this is done, it becomes easier to irradiate ultraviolet light to other bacteria beneath the bacteria and efficiency of bacteria elimination is improved.

Further, with this embodiment, since an inner surface of the flow path section 41 around the UV filament lamps 6 is made a reflecting surface for reflecting ultraviolet light, it is possible to improve the bacteria removing efficiency of the ultraviolet light.

Water inside the body 1 from which bacteria have been eliminated passes through the discharge section 3, and is sent to the user side and utilized.

Incidentally the description of the embodiment is merely a single example and does not represent the essential structure of the present invention. The structure of each section is not limited to the examples above as long as it can realize the object of the present invention.

For example, it is possible for the control section 7 to have the following functions. Specifically, when the detected flow rate is constant and a time that is fixed exceeds a standard value (threshold value), it means there is leakage and it is possible to issue a warning signal. This warning signal is sent, for example, as radio.

It is also possible for the control section 7 to have a configuration where respective accumulated lighting times for the plurality of UV filament lamps are stored. The control section 7 can also issue a warning signal when the accumulated lighting time reaches the threshold value or when it exceeds the threshold value. It is possible to replace a lamp based on the warning signal.

While illustrative embodiments have been illustrated and described, it will be appreciated that various changes can be made therein without departing from the spirit and scope of the invention.

The embodiments of the invention in which an exclusive property or privilege is claimed are defined as follows:

1. A bacteria eliminator for removing bacteria from water supplied from a water main or other water supply means, comprising a flow passage, a detection section, a UV filament lamp, and a control section, the flow passage allowing the passage of water sent from the water supply means, the detection section sending detection signals corresponding to flow amount of the water to the control section, and the UV filament lamp generating ultra violet light, wherein the control section has:
    (1) a function of causing electrical current for pre-heating to flow in the UV filament lamp when the UV filament lamp is not lit;
    (2) a function of lighting the UV filament lamp according to detection signals from the detection section;
    wherein the UV filament lamp comprises a filament and a plate enclosed by a cover, the plate initially coated with mercury amalgam, wherein the filament and the plate are electrically connected to the control section, and wherein the UV filament lamp generates ultra violet light by emitting thermoelectrons from the filament to the plate and into mercury in a vapor state enclosed in the cover;
    wherein the cover is constructed from ultraviolet-ray transmitting glass;
    wherein the control section is configured to use, as minimum electric current value for the pre-heating, electric current value which maintains the vapor state of the mercury in the UV filament lamp; and
    wherein the control section is configured to use, as maximum electric current value for the pre-heating, electric current value such that the thermoelectron discharge amount from the filament to the plate is sufficiently low to avoid overheating of the UV filament lamp to avoid damage to the UV filament lamp even if water supplied from the water main or the other water supply means passes through the flow passage.

2. The bacteria eliminator of claim 1, wherein there is a plurality of the UV filament lamps and the control section controls a number of UV filament lamps to be lit according to detection signals from the detection section.

3. The bacteria eliminator of claim 2, wherein the control section stores lighting times for the plurality of UV filament lamps, and when a UV filament lamp that is not lit is to be lit again the control section gives priority to lighting of a lamp that has the shortest lighting time.

4. The bacteria eliminator of claim 1, further comprising:
    a body, wherein the flow passage is formed passing through the body, the UV filament lamp is arranged facing the flow passage inside the body, the body is provided with an obstructing section, and the obstructing section is arranged at an inner part of the flow passage inside the body and obstructs and agitates the flow of water.

5. The bacteria eliminator of claim 1, wherein an inner surface of the flow passage around the UV filament lamp is made a reflecting surface for reflecting ultra violet light.

6. The bacteria eliminator of claim 1, wherein the control section stores accumulated lighting time for the UV filament lamp, and further, the control section generates a warning signal when the accumulated lighting time has reached, or exceeded, a threshold value.

7. The bacteria eliminator of claim 2, wherein the control section stores accumulated lighting time for the plurality of UV filament lamps, and further, the control section generates a warning signal when the accumulated lighting time has reached, or exceeded, a threshold value.

8. The bacteria eliminator of claim 3, wherein the control section stores accumulated lighting time for the plurality of UV filament lamps, and further, the control section generates a warning signal when the accumulated lighting time has reached, or exceeded, a threshold value.

9. The bacteria eliminator of claim 8, wherein the accumulated lighting time for each of the plurality of UV filament lamps is the total usage time that the UV filament lamp is turned on during at least one cycle of turning the UV filament lamp on and off.

10. The bacteria eliminator of claim 6, wherein the accumulated lighting time for each of the plurality of UV filament lamps is the total usage time that the UV filament lamp is turned on during at least one cycle of turning the UV filament lamp on and off.

11. The bacteria eliminator of claim 7, wherein the accumulated lighting time for each of the plurality of UV filament lamps is the total usage time that the UV filament lamp is turned on during at least one cycle of turning the UV filament lamp on and off.

* * * * *